(12) United States Patent
Wei et al.

(10) Patent No.: US 9,775,061 B2
(45) Date of Patent: Sep. 26, 2017

(54) METHOD AND DEVICE FOR THREE-DIMENSIONAL CHANNEL MEASUREMENT RESOURCE CONFIGURATION AND QUALITY MEASUREMENT

(71) Applicant: China Academy of Telecommunications Technology, Beijing (CN)

(72) Inventors: Ruiping Wei, Beijing (CN); Meifang Jing, Beijing (CN); Xin Su, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 121 days.

(21) Appl. No.: 14/761,303

(22) PCT Filed: Jan. 21, 2014

(86) PCT No.: PCT/CN2014/070939
§ 371 (c)(1),
(2) Date: Jul. 15, 2015

(87) PCT Pub. No.: WO2014/121690
PCT Pub. Date: Aug. 14, 2014

(65) Prior Publication Data
US 2015/0350942 A1 Dec. 3, 2015

(30) Foreign Application Priority Data
Feb. 5, 2013 (CN) .......................... 2013 1 0045899

(51) Int. Cl.
*H04B 7/06* (2006.01)
*H04W 24/08* (2009.01)
(Continued)

(52) U.S. Cl.
CPC .......... *H04W 24/08* (2013.01); *H04B 7/0456* (2013.01); *H04B 17/373* (2015.01);
(Continued)

(58) Field of Classification Search
CPC ... H04W 24/08; H04W 72/044; H04W 72/08; H04W 72/00; H04B 17/373; H04B 7/0456
See application file for complete search history.

(56) References Cited

U.S. PATENT DOCUMENTS 9,306,646 B2 * 4/2016 Park ..................... H04B 7/0456
2009/0221282 A1 * 9/2009 Lee ....................... H04W 24/10
455/424

(Continued)

FOREIGN PATENT DOCUMENTS

CN 101106800 A 1/2008
CN 101873626 A 10/2010
(Continued)

OTHER PUBLICATIONS

Alcatel Lucent; "Considerations on CSI feedback enhancements for high-priority antenna configurations", 3GPP TSG-RAN WG1 Aug. 18, 2011 Meeting #66; 10 pages; Aug. 18, 2011.
(Continued)

*Primary Examiner* — Jay P Patel
(74) *Attorney, Agent, or Firm* — Kilpatrick Townsend & Stockton LLP

(57) ABSTRACT

Provided are a method and device for three-dimensional channel measurement resource configuration and quality measurement, which relate to the field of wireless communications and are used for solving the problem of how to perform three-dimensional channel quality measurement. In the present invention, a base station selects a channel quality measurement resource used for three-dimensional channel
(Continued)

measurement from channel quality measurement resources preconfigured for a terminal, and sends indication information about the selected channel quality measurement resource to the terminal; the terminal receives the indication information, and performs three-dimensional channel quality measurement on corresponding channel quality measurement resources, thereby solving the problem of how to perform three-dimensional channel quality measurement.

18 Claims, 6 Drawing Sheets

(51) Int. Cl.
    *H04B 7/0456* (2017.01)
    *H04B 17/373* (2015.01)
    *H04W 72/08* (2009.01)
    *H04W 72/04* (2009.01)
    *H04W 72/00* (2009.01)

(52) U.S. Cl.
    CPC ......... *H04W 72/044* (2013.01); *H04W 72/08* (2013.01); *H04W 72/00* (2013.01)

(56) References Cited

U.S. PATENT DOCUMENTS

| | | | |
|---|---|---|---|
| 2011/0019613 A1 | 1/2011 | Han et al. | |
| 2011/0141987 A1 | 6/2011 | Nam et al. | |
| 2012/0195264 A1 | 8/2012 | Taoka et al. | |
| 2012/0307922 A1 | 12/2012 | Simonsson et al. | |
| 2014/0286182 A1* | 9/2014 | Chen | H04L 5/0023 370/252 |
| 2015/0341091 A1* | 11/2015 | Park | H04B 7/0456 375/267 |
| 2015/0358060 A1* | 12/2015 | Park | H04B 7/0473 370/329 |

FOREIGN PATENT DOCUMENTS

| | | |
|---|---|---|
| CN | 101888646 A | 11/2010 |
| CN | 102223212 A | 10/2011 |
| CN | 102237951 A | 11/2011 |
| CN | 102571284 A | 7/2012 |

OTHER PUBLICATIONS

Huawei, Hisilicon; "Use scenarios for elevation beamforming", 3GPP TSG RAN WG1 Meeting #72; 3 pages; Jan. 19, 2013.

International Search Report for PCT /CN2014/070939.

Erik Dahlman et al., "4G LTE/LTE-Advanced for Mobile Broadband—Chapter 10" In: "4G LTE/LTE—Advanced for Mobile Broadband—Chapter 10", Mar. 29, 2011, XP055046016, pp. 145-202, * p. 158-p. 161 *.

New Postcom, "Remaining details of EPDCCH starting symbol configuration", 3GPP Draft; R1-124796_Remaining Details of EPDCCH Starting Symbol Configuration, 3$^{rd}$ Generation Partnership Project (3GPP), Mobile Competence Centre; 650, Route des Lucioles; F-06921 Sophia-Antipoli, vol. RAN WG1, no. New Orleans, USA; Nov. 12, 2012-Nov. 16, 2012, Nov. 3, 2012, XP050662792, Retrieved from the Internet: URL: http://www.3gpp.org/ftp/tsg_ran/WG1_RL1/TSGR1_71/Docs/ [retrieved on Nov. 3, 2012] *section 2.2*.

Qualcomm Incorporated, "Remaining details of EPDCCH Starting Symbol Configuration", 3GPP Draft; R1-125108 Remaining Details of EPDCCH Starting Symbol Configuration, 3$^{rd}$ Generation Partnership Project (3GPP), Mobile Competence Centre; 650, Route Des Lucioles; F-06921 Sophia-Antipoli, vol. RAN WG1, no. New Orleans, USA; Nov. 2, 2012-Nov. 16, 2012, Nov. 3, 2012, XP050662969, Retrieved from the Internet: URL:http://www.3gpp.org/ftp/tsg_ran/WG1_RL1/TSGR1_71/Docs/ [retrieved on Nov. 3, 2012] * p. 1-p. 2*.

European Search Report for EP 14 83 6270 dated Jun. 30, 2016, 10 pages.

* cited by examiner

METHOD AND DEVICE FOR THREE-DIMENSIONAL CHANNEL MEASUREMENT RESOURCE CONFIGURATION AND QUALITY MEASUREMENT

This application is a US National Stage of International Application No. PCT/CN2014/070939, filed on Jan. 21, 2014, designating the United States and claiming the priority to Chinese Patent Application No. 201310045899.4, filed with the State Intellectual Property Office of People's Republic of China on Feb. 5, 2013 and entitled "Method and device for three-dimensional channel measurement resource configuration and quality measurement", the content of which is hereby incorporated by reference in its entirety.

FIELD

The present invention relates to the field of communications and particularly to a method and device for three-dimensional channel measurement resource configuration and quality measurement.

BACKGROUND

Antennas have been applied on a large scale in reality along with increasing maturation of Active Antenna System (AAS) technologies. The quality of three-dimensional channels cannot be measured in the existing Long Term Evolution (LTE) and Long Term Evolution-Advanced (LTE-A) system, but after the antennas are applied on a large scale, the number of ports controllable by a base station can grow dramatically to 64 or even more, so that the three-dimensional channels can be increasingly applied. It is highly desirable to address the issue of how to measure effectively the quality of three-dimensional channels.

The quality of a channel is typically measured using a Cell-specific Reference Signal (CRS) and a Channel State Information-Reference Signal (CSI-RS) in the existing system, where the CRS is transmitted in each sub-frame, and at most four ports are supported; and a User Equipment (UE) can obtain the positions of resources occupied by the CRS according to a broadcast channel and a cell identifier (ID). The CSI-RS is configured periodically, and a transmission periodicity, the number of ports, and the positions of occupied resources are signaled in Radio Resource Control (RRC) signaling; at most eight ports can be supported; and the concept of a process is defined in the LTE-A system, where each process corresponds to one CSI-RS measurement resource, and each UE can be configured with a plurality of processes.

Controllable antenna elements are arranged in a two-dimensional pattern in the case of three-dimensional channels, but controllable antenna elements in the existing system are arranged in a linear array. Although multi-port channel measurement can be made by configuring a plurality of CSI-RS resources in the existing system, the CSI-RS resources are independent of each other, so that the UE cannot obtain the overall quality of the three-dimensional channels by jointing measurement results on the plurality of CSI-RS resources, and since the qualities of horizontal and vertical channels in the case of the three-dimensional channels are not totally independent of each other, it is highly desirable to address the issue of how to instruct the UE to obtain the overall information of the three-dimensional channels, and moreover a support of measuring the quality of the three-dimensional channels has been absent in the existing system.

SUMMARY

Embodiments of the invention provide a method and device for three-dimensional channel measurement configuration and quality measurement so as to address the issue of how to measure the quality of three-dimensional channels.

A method for configuring resources for three-dimensional channel measurement includes:

selecting, by a base station provided with a two-dimensional array of antennas, channel quality measurement resources for three-dimensional channel measurement from channel quality measurement resources preconfigured for a user equipment, wherein each of the channel quality measurement resources corresponds to one time-frequency resource position and at least one port; and transmitting, by the base station for each of the selected channel quality measurement resources a channel measurement reference signal to the user equipment via the port or ports corresponding to the channel quality measurement resource on the time-frequency resource position corresponding to the channel quality measurement resource, and transmitting indicators of the selected channel quality measurement resources to the user equipment.

A method for three-dimensional channel measurement includes:

receiving, by a user equipment, indicators, transmitted by a base station provided with a two-dimensional array of antennas, of channel quality measurement resources for three-dimensional channel measurement, wherein the channel quality measurement resources for three-dimensional channel measurement are selected by the base station from channel quality measurement resources preconfigured for the user equipment, and each of the channel quality measurement resources corresponds to one time-frequency resource position and at least one port;

receiving, by the user equipment, for each of the channel quality measurement resources for three-dimensional channel measurement a channel measurement reference signal transmitted by the base station via the port or ports corresponding to the channel quality measurement resource on the time-frequency resource position corresponding to the channel quality measurement resource, and making channel quality measurement according to the channel measurement reference signal;

obtaining, by the user equipment, three-dimensional channel quality information according to results of the channel quality measurement, and reporting the three-dimensional channel quality information to the base station.

A base station provided with a two-dimensional array of antennas includes:

a selecting unit configured to select channel quality measurement resources for three-dimensional channel measurement from channel quality measurement resources preconfigured for a user equipment, wherein each of the channel quality measurement resources corresponds to one time-frequency resource position and at least one port; and a transmitting unit configured to transmit for each of the selected channel quality measurement resources a channel measurement reference signal to the user equipment via the port or ports corresponding to the channel quality measurement resource on the time-frequency resource position corresponding to the channel quality measurement resource, and to transmit indicators of the selected channel quality measurement resources to the user equipment.

A user equipment includes:

a receiving unit configured to receive indicators, transmitted by a base station provided with a two-dimensional array of antennas, of channel quality measurement resources for three-dimensional channel measurement, wherein the channel quality measurement resources for three-dimensional channel measurement are selected by the base station from channel quality measurement resources preconfigured for the user equipment, and each of the channel quality measurement resources corresponds to one time-frequency resource position and at least one port;

a measuring unit configured to receive for each of the channel quality measurement resources for three-dimensional channel measurement a channel measurement reference signal transmitted by the base station via the port or ports corresponding to the channel quality measurement resource on the time-frequency resource position corresponding to the channel quality measurement resource, and to make channel quality measurement according to the channel measurement reference signal;

a determining unit configured to obtain three-dimensional channel quality information according to results of the channel quality measurement; and a reporting unit configured to report the three-dimensional channel quality information to the base station.

A base station includes a two-dimensional array of antennas, a transceiver, a processor, and a memory, wherein:

the processor is configured with one or more executable programs to select channel quality measurement resources for three-dimensional channel measurement from channel quality measurement resources preconfigured for a user equipment, wherein each of the channel quality measurement resources corresponds to one time-frequency resource position and at least one port; and to transmit for each of the selected channel quality measurement resources a channel measurement reference signal to the user equipment via the port or ports corresponding to the channel quality measurement resource on the time-frequency resource position corresponding to the channel quality measurement resource, and to transmit indicators of the selected channel quality measurement resources to the user equipment; and the memory is configured to store the one or more executable programs for configuring the processor.

A user equipment includes antennas, a transceiver, a processor, and a memory, wherein:

the processor is configured with one or more executable programs to receive indicators, transmitted by a base station provided with a two-dimensional array of antennas, of channel quality measurement resources for three-dimensional channel measurement, through the antennas and the transceiver, wherein the channel quality measurement resources for three-dimensional channel measurement are selected by the base station from channel quality measurement resources preconfigured for the user equipment, and each of the channel quality measurement resources corresponds to one time-frequency resource position and at least one port;

to receive for each of the channel quality measurement resources for three-dimensional channel measurement a channel measurement reference signal transmitted by the base station via the port or ports corresponding to the channel quality measurement resource on the time-frequency resource position corresponding to the channel quality measurement resource through the transceiver and the antennas, to make channel quality measurement according to the channel measurement reference signal, and to obtain three-dimensional channel quality information according to results of the channel quality measurement; and to report the three-dimensional channel quality information to the base station through the transceiver and the antennas; and the memory is configured to store the one or more executable programs for configuring the processor.

In the solutions according to the embodiments of the invention, the base station provided with a two-dimensional array of antennas selects channel quality measurement resources for three-dimensional channel measurement from channel quality measurement resources preconfigured for the user equipment, transmits indicators of the selected channel quality measurement resources to the user equipment, and transmits for each of the selected channel quality measurement resources a channel measurement reference signal to the user equipment via the port or ports corresponding to the channel quality measurement resource on the time-frequency resource position corresponding to the channel quality measurement resource; and the user equipment receives the indicators, transmitted by the base station, of the channel quality measurement resources for three-dimensional channel measurement, receives for each of the channel quality measurement resources for three-dimensional channel measurement the channel measurement reference signal transmitted by the base station via the port or ports corresponding to the channel quality measurement resource on the time-frequency resource position corresponding to the channel quality measurement resource, makes channel quality measurement according to the channel measurement reference signal; and obtains three-dimensional channel quality information according to all of results of the channel quality measurement, and reports the three-dimensional channel quality information to the base station. As can be apparent, in the solutions, the base station signals the channel quality measurement resources for three-dimensional channel measurement to the user equipment, and the user equipment makes three-dimensional channel quality measurement over the corresponding channel quality measurement resources, to thereby address the issue of how to make three-dimensional channel quality measurement.

DETAILED DESCRIPTION OF THE EMBODIMENTS

In order to provide a support of measuring the quality of three-dimensional channels at the user equipment side, an embodiment of the method provides a method for configuring measurement resources of three-dimensional channels.

Figure 1:
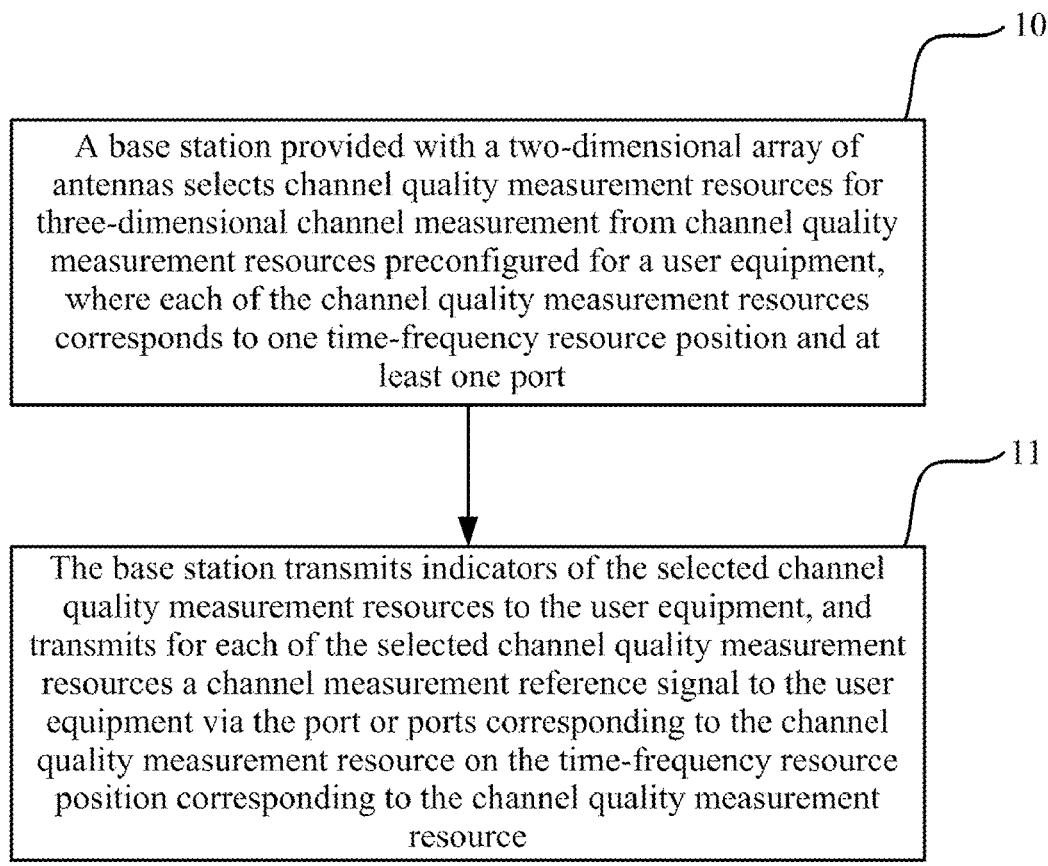
FIG. 1 illustrates a schematic flow chart of a method according to an embodiment of the invention.

Referring to FIG. 1, a method for configuring resources for three-dimensional channel measurement according to an embodiment of the invention includes the following operations:

Operation 10: A base station provided with a two-dimensional array of antennas selects channel quality measurement resources for three-dimensional channel measurement from channel quality measurement resources preconfigured for a user equipment, where each of the channel quality measurement resources corresponds to one time-frequency resource position and at least one port.

Here the time-frequency resource position corresponding to the channel quality measurement resource can be determined by a time-frequency resource position occupied by a channel quality measurement reference signal in a transmission sub-frame, a sub-frame offset, a measurement periodicity, and other parameters thereof. For example, if the time-frequency resource position occupied by the channel quality measurement reference signal in the transmission sub-frame includes two Resource Elements (REs) on the sixth and seventh Orthogonal Frequency Division Multiplexing (OFDM) symbols corresponding to the third carrier on each Physical Resource Block (PRB) in the first timeslot, the measurement periodicity is five sub-frames, and the sub-frame offset is 2, then the time-frequency resource position corresponding to the channel quality measurement resource includes two REs on the sixth and seventh OFDM symbols corresponding to the third carrier on each PRB in the first timeslot in the second sub-frame in a periodicity. The port or ports corresponding to the channel quality measurement resource can be determined by the number of ports. For example, if the number of ports is 1, then the port corresponding to the channel quality measurement resource includes the port 0; if the number of ports is 2, then the ports corresponding to the channel quality measurement resource include the ports 0 and 1; if the number of ports is 4, then the ports corresponding to the channel quality measurement resource include the ports 0, 1, 2 and 3; and if the number of ports is 8, then the ports corresponding to the channel quality measurement resource include the ports 0, 1, 2, 3, 4, 5, 6 and 7.

Operation 11: The base station transmits indicators of the selected channel quality measurement resources to the user equipment, and transmits for each of the selected channel quality measurement resources a channel measurement reference signal to the user equipment via the port or ports corresponding to the channel quality measurement resource on the time-frequency resource position corresponding to the channel quality measurement resource.

Furthermore before the base station selects the channel quality measurement resources for three-dimensional channel measurement from the channel quality measurement resources preconfigured for the user equipment, the base station configures the user equipment with a plurality of channel quality measurement resources and numbers the measurement resources, where each of the configured plurality of channel quality measurement resources corresponds to one time-frequency resource position and at least one port; and then the base station transmits indicators of the configured plurality of channel quality measurement resources to the user equipment in Radio Resource Control (RRC) signaling. The indicator of each of the configured plurality of channel quality measurement resources can include parameters representing the time-frequency resource position corresponding to the channel quality measurement resource, the number of ports corresponding to the channel quality measurement resource, etc.; and the serial number of each of the configured plurality of channel quality measurement resources can also be concurrently transmitted to the user equipment, so that the indicators of the selected channel quality measurement resources in the operation 11 can be the serial numbers of the selected channel quality measurement resources.

Particularly in the operation 10, the base station can select the channel quality measurement resources for three-dimensional channel measurement from the channel quality measurement resources preconfigured for the user equipment particularly as follows:

The base station selects at least one of the channel quality measurement resources preconfigured for the user equipment as a channel quality measurement resource for three-dimensional channel measurement, where the sum of the numbers of ports corresponding to the respective selected channel quality measurement resource is equal to the total number of ports to be measured for three-dimensional-Multiple Input Multiple Output (3D-MIMO). Here the total number of ports to be measured for 3D-MIMO refers to the total number of ports configured at the base station side to obtain the quality of three-dimensional spatial channels in the case of 3D-MIMO, where the number of ports is more than 1.

In this method, the channel quality measurement resource can be a Channel State Information-Reference Signal (CSI-RS) resource; and the channel measurement reference signal is a CSI-RS.

In order to address the issue of how to measure the quality of three-dimensional channels, an embodiment of the invention provides a method for three-dimensional channel measurement.

Figure 2:
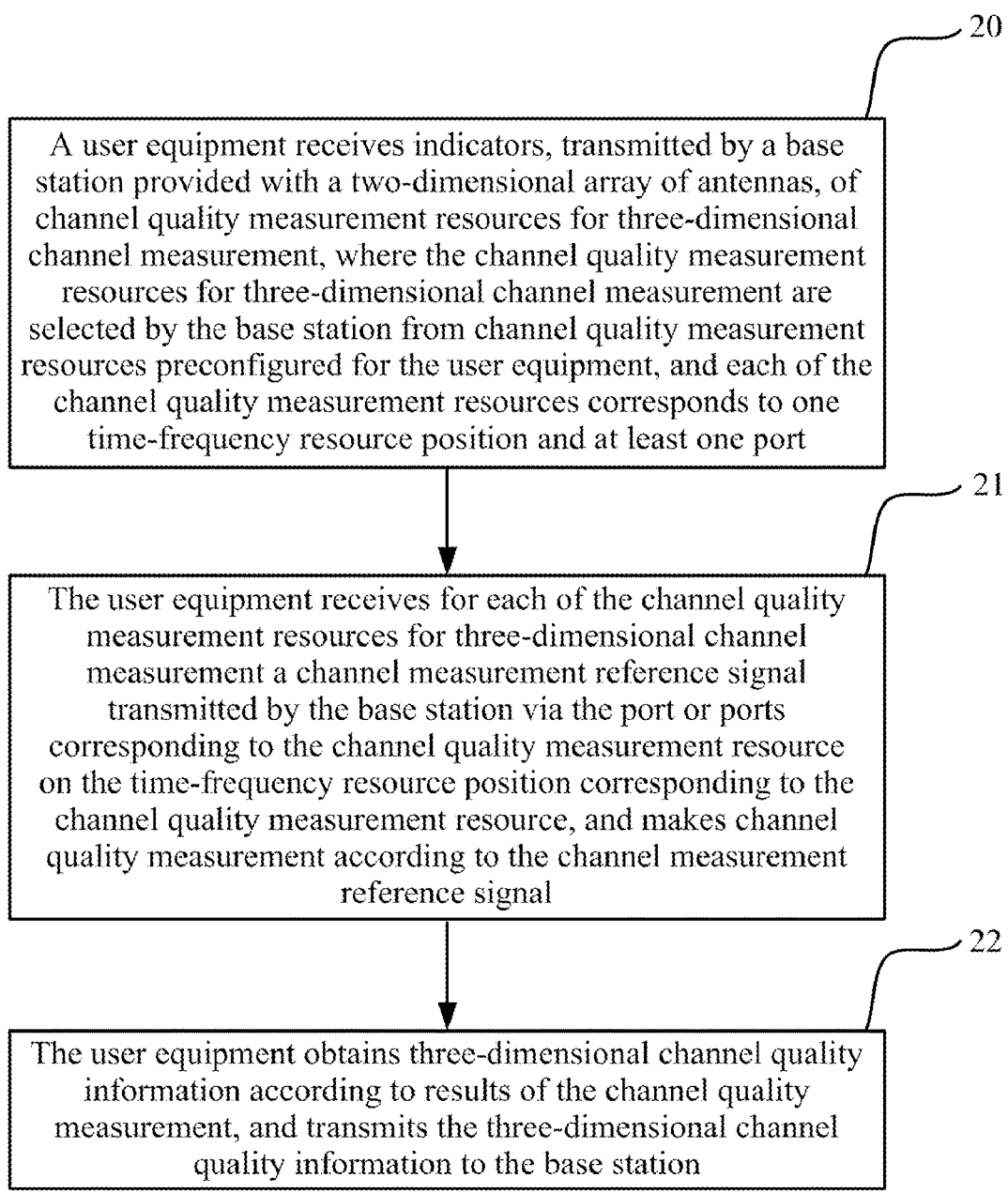
FIG. 2 illustrates a schematic flow chart of another method according to an embodiment of the invention.

Referring to FIG. 2, an embodiment of the invention provides a method for three-dimensional channel measurement, which includes the following operations:

Operation 20: A user equipment receives indicators, transmitted by a base station provided with a two-dimensional array of antennas, of channel quality measurement resources for three-dimensional channel measurement, where the channel quality measurement resources for three-dimensional channel measurement are selected by the base station from channel quality measurement resources preconfigured for the user equipment, and each of the channel quality measurement resources corresponds to one time-frequency resource position and at least one port.

Here the time-frequency resource position corresponding to the channel quality measurement resource can be determined by a time-frequency resource position occupied by a channel quality measurement reference signal in a transmission sub-frame, a sub-frame offset, a measurement periodicity, and other parameters thereof. For example, if the time-frequency resource position occupied by the channel quality measurement reference signal in the transmission sub-frame includes two REs on the sixth and seventh OFDM symbols corresponding to the third carrier on each PRB in the first timeslot, the measurement periodicity is five subframes, and the sub-frame offset is 2, then the time-frequency resource position corresponding to the channel quality measurement resource includes two REs on the sixth and seventh OFDM symbols corresponding to the third carrier on each PRB in the first timeslot in the second sub-frame in a periodicity. The port or ports corresponding to the channel quality measurement resource can be determined by the number of ports. For example, if the number of ports is 1, then the port corresponding to the channel quality measurement resource includes the port 0; if the number of ports is 2, then the ports corresponding to the channel quality measurement resource include the ports 0 and 1; if the number of ports is 4, then the ports corresponding to the channel quality measurement resource include the ports 0, 1, 2 and 3; and if the number of ports is 8, then the ports corresponding to the channel quality measurement resource include the ports 0, 1, 2, 3, 4, 5, 6 and 7.

Operation 21: The user equipment receives for each of the channel quality measurement resources for three-dimensional channel measurement a channel measurement reference signal transmitted by the base station via the port or ports corresponding to the channel quality measurement resource on the time-frequency resource position corresponding to the channel quality measurement resource, and makes channel quality measurement according to the channel measurement reference signal.

Operation 22: The user equipment obtains three-dimensional channel quality information according to results of the channel quality measurement, and reports the three-dimensional channel quality information to the base station.

Furthermore before the user equipment receives the indicators, transmitted by the base station, the channel quality measurement resources for three-dimensional channel measurement, the user equipment can receive indicators of a plurality of channel quality measurement resources configured by the base station, where each of the plurality of channel quality measurement resources corresponds to one time-frequency resource position and at least one port. The indicator of each of the configured plurality of channel quality measurement resources can include parameters representing the time-frequency resource position corresponding to the channel quality measurement resource, the number of ports corresponding to the channel quality measurement resource, etc.; and the user equipment can further concurrently receive the serial number of each of the configured plurality of channel quality measurement resources, so that the indicators of the channel quality measurement resources for three-dimensional channel measurement received by the user equipment in the operation 20 can be the serial numbers of the channel quality measurement resources for three-dimensional channel measurement.

Particularly the sum of the numbers of ports corresponding to the respective channel quality measurement resources for three-dimensional channel measurement is equal to the total number of ports to be measured for 3D-MIMO. Here the total number of ports to be measured for 3D-MIMO refers to the total number of ports configured at the base station side to obtain the quality of three-dimensional spatial channels in the case of 3D-MIMO, where the number of ports is more than 1. Correspondingly the user equipment can obtain the three-dimensional channel quality information according to the results of the channel quality measurement in the operation 22 particularly as follows:

The user equipment determines the position or positions, in the two-dimensional array of antennas of the base station, of the port or ports corresponding to each of the channel quality measurement resources for three-dimensional channel measurement according to preconfigured information;

The user equipment obtains for each row in the two-dimensional array of antennas of the base station a channel correlation matrix corresponding to the row of ports according to results of the channel quality measurement on the respective ports in the row; and obtains horizontal Precoding Matrix Indicator (PMI) information according to the channel correlation matrixes corresponding to the respective rows of ports, and obtains horizontal Channel Quality Indicator (CQI) information according to the PMI information (reference can be made to the 3GPP TS 36.213 protocol for details thereof); and The user equipment obtains for each column in the two-dimensional array of antennas of the base station a channel correlation matrix corresponding to the column of ports according to results of the channel quality measurement on the respective ports in the column; and obtains vertical PMI information according to the channel correlation matrixes corresponding to the respective columns of ports, and obtains vertical CQI information according to the PMI information.

Particularly the user equipment can obtain the channel correlation matrix $R_{HH_n}$ corresponding to the n-th row of ports in the two-dimensional array of antennas of the base station in Equation 1 below:

$$R_{HH_n} = (H_{n,0}, H_{n,1}, H_{n,2}, \ldots, H_{n,M-1})^{H*}(H_{n,0}, H_{n,1}, H_{n,2}, \ldots, H_{n,M-1}); \quad \text{Equation 1}$$

Where $H_{n,m}$ represents a channel quality measurement value on a port in the n-th row and in the m-th column in the two-dimensional array of antennas of the base station, where n ranges from 0 (inclusive) to N−1 (inclusive), and m ranges from 0 (inclusive) to M−1 (inclusive), where N represents the total number of rows in the two-dimensional array of antennas of the base station, and M represents the total number of columns in the two-dimensional array of antennas of the base station; and $H_{n,m} = [h_{n,m,0}, h_{n,m,1}, \ldots, h_{n,m,R-1}]^T$, where $h_{n,m,r}$ represents a channel quality measurement result on the port in the n-th row and in the m-th column over the r-th receive antenna, where r ranges from 0 (inclusive) to R−1 (inclusive), where R represents the total number of receive antennas of the user equipment, and the superscript T represents transposition of the matrix.

Particularly the user equipment can obtain the horizontal PMI information according to the channel correlation matrixes corresponding to the respective rows of ports particularly as follows:

The user equipment obtains an average matrix $R_{HH}$ of the channel correlation matrixes corresponding to the respective rows of ports in Equation 2 below:

$$R_{HH} = \frac{1}{N} \sum_{n=0}^{N-1} R_{HH_n}; \quad \text{Equation 2}$$

and

The user equipment obtains the horizontal PMI information by decomposing the average matrix $R_{HH}$ (for example, decomposing $R_{HH}$ through SVD decomposition method).

Particularly the user equipment can obtain the channel correlation matrix $R_{HH_m}$ corresponding to the m-th column of ports in the two-dimensional array of antennas of the base station in Equation 3 below:

$$R_{HH_m} = (H_{0,m}, H_{1,m}, \ldots, H_{N-1,m})^{H*}(H_{0,m}, H_{1,m}, \ldots, H_{N-1,m}); \quad \text{Equation 3}$$

Where $H_{n,m}$ represents a channel quality measurement value on a port in the n-th row and in the m-th column in the two-dimensional array of antennas of the base station, where n ranges from 0 (inclusive) to N−1 (inclusive), and m ranges from 0 (inclusive) to M−1 (inclusive), where N represents the total number of rows in the two-dimensional array of antennas of the base station, and M represents the total number of columns in the two-dimensional array of antennas of the base station; and $H_{n,m}=[h_{n,m,0}, h_{n,m,1}, \ldots, h_{n,m,R-1}]^T$, where $h_{n,m,r}$ represents a channel quality measurement result on the port in the n-th row and in the m-th column over the r-th receive antenna, where r ranges from 0 (inclusive) to R−1 (inclusive), where R represents the total number of receive antennas of the user equipment, and the superscript T represents transposition of the matrix.

Particularly the user equipment can obtain the vertical PMI information according to the channel correlation matrixes corresponding to the respective columns of ports particularly as follows:

The user equipment obtains an average matrix $R_{HH}$ of the channel correlation matrixes corresponding to the respective columns of ports in Equation 4 below:

$$R_{HH} = \frac{1}{M}\sum_{m=0}^{M-1} R_{HH_m};$$  Equation 4 and

The user equipment obtains the vertical PMI information by decomposing the average matrix $R_{HH}$.

In this method, the channel quality measurement resource can be a CSI-RS resource;

and the channel measurement reference signal is a CSI-RS.

Figure 3:
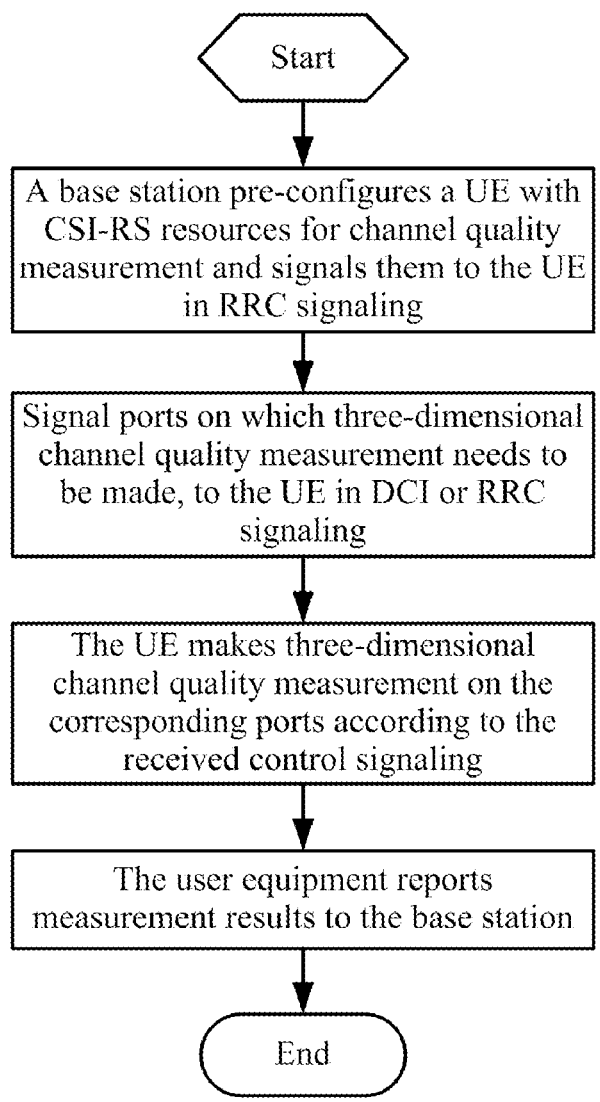
FIG. 3 illustrates a schematic general flow chart according to an embodiment of the invention.

The invention will be described below in details in connection with a particular application scenario:

As illustrated in FIG. 3:

Operation 1: A base station pre-configures channel quality measurement resources including K CSI-RS resources for a UE and numbers the CSI-RS resource sequentially by {0, 1, 2, 3, . . . , K−1}. There are corresponding parameters for each of the CSI-RS resources, e.g., a time-frequency resource position occupied by the CSI-RS resource in a transmission sub-frame, a sub-frame offset, a measurement periodicity, the number of ports, etc. The base station signals the configured CSI-RS resources to the UE in RRC signaling together with the serial numbers corresponding to the respective CSI-RS resources, where K represents an integer more than 1.

Operation 2: Based on the consideration that there are influences of the CSI-RS resources on a system overhead and radio channels may vary differently, a CSI-RS may not be transmitted over all the pre-configured CSI-RS resources, and the quality of three-dimensional channels may not be measured over all the CSI-RS resources even if the CSI-RS is transmitted over all the CSI-RS resources, instead the CSI-RS may be transmitted over the CSI-RS resources over which the quality of three-dimensional channels needs to be measured, or the quality of three-dimensional channels may be measured over a part of the CSI-RS resources. The number of selected CSI-RS resources for three-dimensional channel measurement is dependent upon the total number of ports to be measured for 3D-MIMO, and the respective CSI-RS resources may correspond to different numbers of ports, but the sum of the numbers of ports of all the selected CSI-RS resources for three-dimensional channel measurement is equal to the total number of ports to be measured for 3D-MIMO. The selected CSI-RS resources for three-dimensional channel measurement need to be signaled to the UE in RRC signaling or DCI signaling.

Operation 3: The UE makes three-dimensional channel quality measurement over the CSI-RS resources for three-dimensional channel measurement according to the received control signaling. In order to lower a feedback overhead and to facilitate a design of a codebook, vertical and horizontal channel quality information can be fed back separately. $H_{n,m}$ represents a channel measurement value on a port in the n-th row and in the m-th column in the two-dimensional array of antennas of the base station, where N represents the total number of rows in the two-dimensional array of antennas, and M represents the total number of columns in the two-dimensional array of antennas. $H_{n,m}$ represents a column vector, and $H_{n,m}=[h_{n,m,0}, h_{n,m,1}, \ldots, h_{n,m,R-1}]^T$, where R represents the total number of receive antennas of the user equipment, and the superscript T represents transposition of the matrix. For horizontal channel quality measurement, firstly a channel correlation matrix corresponding to each row of ports is obtained in the equation below of:

$$R_{HH_n} = (H_{n,0}, H_{n,1}, H_{n,2}, \ldots, H_{n,M-1})^{H*}(H_{n,0}, H_{n,1}, H_{n,2}, \ldots, H_{n,M-1});$$

The obtained N channel correlation matrixes are averaged in the equation below of:

$$R_{HH} = \frac{1}{N}\sum_{n=0}^{N-1} R_{HH_n};$$

and

Horizontal PMIs can be obtained by decomposing and calculating the matrix $R_{HH}$, and CQIs corresponding to the PMIs can be calculated.

For vertical channel quality measurement, firstly a channel correlation matrix corresponding to each column of ports is obtained in the equation below of:

$$R_{HH_m} = (H_{0,m}, H_{1,m}, \ldots, H_{N-1,m})^{H*}(H_{0,m}, H_{1,m}, \ldots, H_{N-1,m});$$

The obtained M channel correlation matrixes are averaged in the equation below of:

$$R_{HH} = \frac{1}{M}\sum_{m=0}^{M-1} R_{HH_m};$$

and

Finally vertical PMIs can be obtained by decomposing and calculating the matrix $R_{HH}$, and CQIs corresponding to the PMIs can be calculated.

Operation 4: The UE reports the horizontal CQIs and the vertical CQIs to the base station.

The invention will be described below in details in connection with another particular application scenario:

In a first operation, a base station pre-configures channel quality measurement resources including K CSI-RS resources for a UE and numbers the CSI-RS resource sequentially by {0, 1, 2, 3, . . . , K−1}. For example, if the channel quality measurement resources include eight CSI-RS resources, then the eight CSI-RS resources are numbered sequentially by {0, 1, 2, 3, 4, 5, 6, 7}. There are corresponding parameters for each of the CSI-RS resources, e.g., a time-frequency resource position occupied by the CSI-RS resource in a transmission sub-frame, a sub-frame offset, a measurement periodicity, the number of ports, etc. The base station signals the configured CSI-RS resources to the UE in RRC signaling together with the serial numbers corresponding to the respective CSI-RS resources.

In a second operation, based on the consideration that there are influences of the CSI-RS resources on a system overhead and radio channels may vary differently, a CSI-RS may not be transmitted over all the pre-configured CSI-RS resources, and the quality of three-dimensional channels may not be measured over all the CSI-RS resources even if the CSI-RS is transmitted over all the CSI-RS resources, instead the CSI-RS may be transmitted over the CSI-RS resources over which the quality of three-dimensional channels needs to be measured, or the quality of three-dimensional channels may be measured over a part of the CSI-RS resources.

Figure 4:
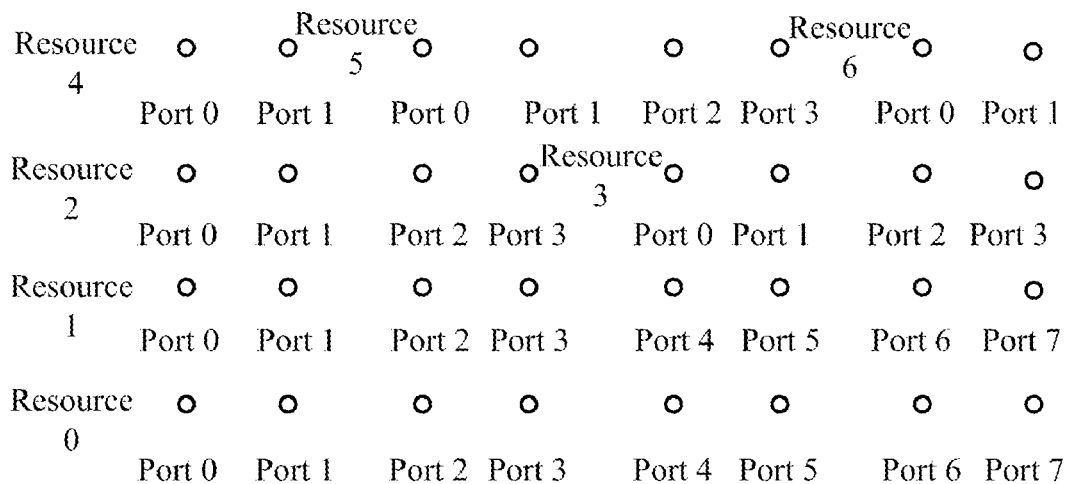
FIG. 4 illustrates a schematic diagram of mapping of measurement resources to an array of ports according to an embodiment of the invention.
Figure 5:
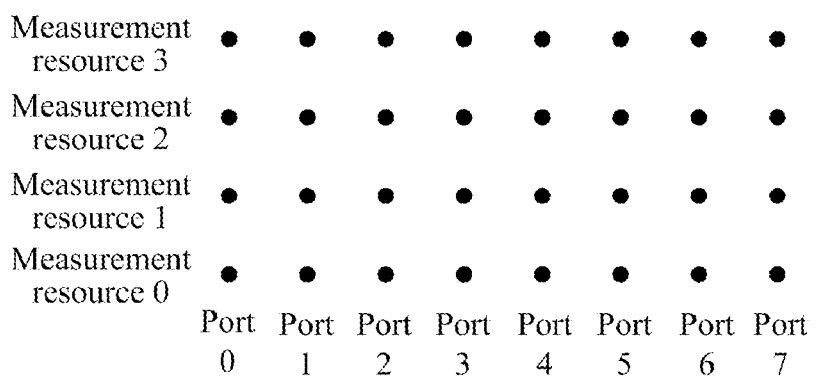
FIG. 5 illustrates another schematic diagram of mapping of measurement resources to an array of ports according to an embodiment of the invention.

The number of selected CSI-RS resources for three-dimensional channel measurement is dependent upon the total number of ports to be measured for 3D-MIMO, and the total number of ports to be measured for 3D-MIMO may take the value of 8, 16, 32, 64, etc. If each of the CSI-RS resources corresponds to four ports, then the numbers of CSI-RS resources required for the four kinds of total number of ports are 2, 4, 8 and 16 respectively; and if each of the CSI-RS resources corresponds to eight ports, then the numbers of CSI-RS resources required for the four kinds of total number of ports are 1, 2, 4 and 8 respectively. However, the respective CSI-RS resources may correspond to different numbers of ports, while the sum of the numbers of ports of all the CSI-RS resources is equal to the total number of ports to be measured for 3D-MIMO. As illustrated in FIG. 4, the total number of ports to be measured for 3D-MIMO is 32, and seven CSI-RS resources are selected, where measurement resources 0 and 1 include an 8-port CSI-RS resource respectively, measurement resources 2, 3 and 5 include a 4-port CSI-RS resource respectively, and measurement resources 4 and 6 include a 2-port CSI-RS resource respectively. FIG. 5 illustrates another configuration including four 8-port CSI-RS resources.

The selected CSI-RS resources for three-dimensional channel measurement are signaled to the UE in RRC signaling or DCI signaling. For example, if there are eight 8-port CSI-RS resources, then they can be signaled in 2-bit RRC signaling or DCI signaling as depicted in Table 1. If the signaling indicates {1, 0}, then three-dimensional channel quality measurement can be made jointly over the $0^{th}$ to $3^{rd}$ CSI-RS resources.

| Signaling format | Resources for three-dimensional channel quality measurement |
| --- | --- |
| 00 | {0} |
| 01 | {0, 1} |
| 10 | {0, 1, 2, 3} |
| 11 | {0, 1, 2, 3, 4, 5, 6, 7} |

In order to configure more flexibly the CSI-RS resources over which three-dimensional channels need to be measured, they can alternatively be indicated in a bitmap. For example, if eight CSI-RS resources are configured, then the eight CSI-RS resources can be indicated respectively by 8-bit signaling, for example, if the signaling indicates {1, 1, 1, 1, 1, 1, 1, 0}, then three-dimensional channel quality measurement can be made jointly over the $0^{th}$ to $6^{th}$ CSI-RS resources.

In a third operation, the UE makes three-dimensional channel quality measurement over the corresponding CSI-RS resources according to the received control signaling. In order to lower a feedback overhead and to facilitate a design of a codebook, vertical and horizontal channel quality information can be fed back separately. As illustrated in FIG. 4, channel qualities on 32 ports need to be measured at the base station side over seven CSI-RS resources with the port configuration illustrated in FIG. 4, and the UE obtains three-dimensional channel quality information by measuring the channel qualities on the corresponding ports, although the same will apply to alternative configurations.

$H_{n,m}$ represents a channel measurement value on a port in the n-th row and in the m-th column in the two-dimensional array, where N represents the total number of rows in the two-dimensional array of antennas, and M represents the total number of columns in the two-dimensional array of antennas. $H_{n,m}$ represents a column vector, and $H_{n,m}=[h_{n,m,0}, h_{n,m,1}, \ldots, h_{n,m,R-1}]^T$, where R represents the total number of receive antennas of the user equipment, and the superscript T represents transposition of the matrix. Referring to FIG. 4 as an example, n takes the value of {0, 1, 2, 3}, and m takes the value of {0, 1, 2, 3, 4, 5, 6, 7}. For horizontal channel quality measurement, firstly a channel correlation matrix corresponding to each row of ports is obtained:

$$R_{HH_n} = (H_{n,0}, H_{n,1}, H_{n,2}, H_{n,3}, H_{n,4}, H_{n,5}, H_{n,6}, H_{n,7})^{H*}(H_{n,0}, H_{n,1}, H_{n,2}, H_{n,3}, H_{n,4}, H_{n,5}, H_{n,6}, H_{n,7});$$

The obtained N channel correlation matrixes are averaged:

$$R_{HH} = \frac{1}{N} \sum_{n=0}^{N-1} R_{HH_n};$$

and

Horizontal PMIs can be obtained by decomposing and calculating the matrix $R_{HH}$, and corresponding CQIs can be calculated.

For vertical channel quality measurement, firstly a channel correlation matrix corresponding to each column of ports is obtained:

$$R_{HH_m} = (H_{0,m}, H_{1,m}, H_{2,m}, H_{3,m})^{H*}(H_{0,m}, H_{1,m}, H_{2,m}, H_{3,m});$$

The obtained M channel correlation matrixes are averaged:

$$R_{HH} = \frac{1}{M} \sum_{m=0}^{M-1} R_{HH_m};$$

and

Finally vertical PMIs can be obtained by decomposing and calculating the matrix $R_{HH}$, and corresponding CQIs can be calculated.

In a fourth operation, the UE reports measurement results to the base station.

Figure 6:
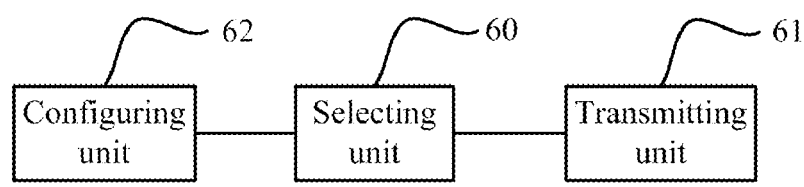
FIG. 6 illustrates a schematic structural diagram of a base station according to an embodiment of the invention.

Referring to FIG. 6, an embodiment of the invention provides a base station which can perform the method for configuring resources for three-dimensional channel measurement according to the embodiment of the invention. The base station provided with a two-dimensional array of antennas includes:

A selecting unit 60 is configured to select channel quality measurement resources for three-dimensional channel measurement from channel quality measurement resources preconfigured for a user equipment, where each of the channel quality measurement resources corresponds to one time-frequency resource position and at least one port; and A transmitting unit 61 is configured to transmit indicators of the selected channel quality measurement resources to the user equipment, and to transmit for each of the selected channel quality measurement resources a channel measurement reference signal to the user equipment via the port or ports corresponding to the channel quality measurement resource on the time-frequency resource position corresponding to the channel quality measurement resource.

Furthermore the base station further includes:

A configuring unit 62 is configured to configure the user equipment with a plurality of channel quality measurement resources, and to number the measurement resources, before the channel quality measurement resources for three-dimensional channel measurement are selected from the channel quality measurement resources preconfigured for the user equipment, where each of the channel quality measurement resources corresponds to one time-frequency resource position and at least one port; and To transmit indicators of the configured plurality of channel quality measurement resources to the user equipment in Radio Resource Control (RRC) signaling.

Furthermore the selecting unit 60 is configured:

To select at least one of the channel quality measurement resources preconfigured for the user equipment as a channel quality measurement resource for three-dimensional channel measurement, where the sum of the numbers of ports corresponding to the respective selected channel quality measurement resource is equal to the total number of ports to be measured for 3D-MIMO.

Furthermore the channel quality measurement resource is a Channel State Information-Reference Signal (CSI-RS) resource; and the channel measurement reference signal is a CSI-RS.

Figure 7:
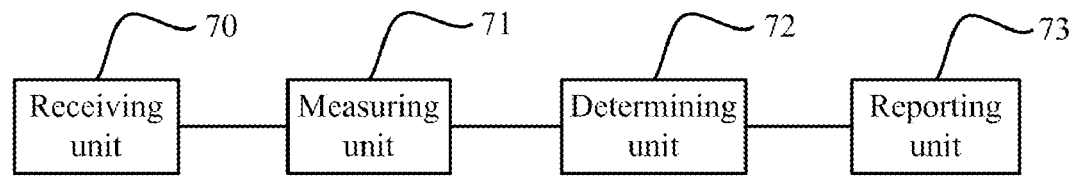
FIG. 7 illustrates a schematic structural diagram of a user equipment according to an embodiment of the invention.

Referring to FIG. 7, an embodiment of the invention provides a user equipment which can perform the method for three-dimensional channel measurement according to the embodiment of the invention. The user equipment includes:

A receiving unit 70 is configured to receive indicators, transmitted by a base station provided with a two-dimensional array of antennas, of channel quality measurement resources for three-dimensional channel measurement, where the channel quality measurement resources for three-dimensional channel measurement are selected by the base station from channel quality measurement resources preconfigured for the user equipment, and each of the channel quality measurement resources corresponds to one time-frequency resource position and at least one port;

A measuring unit 71 is configured to receive for each of the channel quality measurement resources for three-dimensional channel measurement a channel measurement reference signal transmitted by the base station via the port or ports corresponding to the channel quality measurement resource on the time-frequency resource position corresponding to the channel quality measurement resource, and to make channel quality measurement according to the channel measurement reference signal;

A determining unit 72 is configured to obtain three-dimensional channel quality information according to results of the channel quality measurement; and A reporting unit 73 is configured to report the three-dimensional channel quality information to the base station.

Furthermore the receiving unit 70 is further configured:

To receive indicators of a plurality of channel quality measurement resources configured by the base station before receiving the indicators, transmitted by the base station, the channel quality measurement resources for three-dimensional channel measurement, where each of the channel quality measurement resources corresponds to one time-frequency resource position and at least one port.

Furthermore the sum of the numbers of ports corresponding to the respective channel quality measurement resources for three-dimensional channel measurement is equal to the total number of ports to be measured for 3D-MIMO; and the determining unit 72 is configured:

To determine the position or positions, in the two-dimensional array of antennas of the base station, of the port or ports corresponding to each of the channel quality measurement resources for three-dimensional channel measurement;

To obtain for each row in the two-dimensional array of antennas of the base station a channel correlation matrix corresponding to the row of ports according to results of the channel quality measurement on the respective ports in the row; and to obtain horizontal Pre-coding Matrix Indicator (PMI) information according to the channel correlation matrixes corresponding to the respective rows of ports, and to obtain horizontal Channel Quality Indicator (CQI) information according to the PMI information; and To obtain for each column in the two-dimensional array of antennas of the base station a channel correlation matrix corresponding to the column of ports according to results of the channel quality measurement on the respective ports in the column; and to obtain vertical PMI information according to the channel correlation matrixes corresponding to the respective columns of ports, and to obtain vertical CQI information according to the PMI information.

Furthermore the determining unit 72 is configured:

To obtain the channel correlation matrix $R_{HH_n}$ corresponding to the n-th row of ports in the two-dimensional array of antennas of the base station in Equation 1 below:

$$R_{HH_n} = (H_{n,0}, H_{n,1}, H_{n,2}, \ldots, H_{n,M-1})^{H*}(H_{n,0}, H_{n,1}, H_{n,2}, \ldots, H_{n,M-1});$$   Equation 1

Where $H_{n,m}$ represents a channel quality measurement value on a port in the n-th row and in the m-th column in the two-dimensional array of antennas of the base station, where n ranges from 0 (inclusive) to N−1 (inclusive), and m ranges from 0 (inclusive) to M−1 (inclusive), where N represents the total number of rows in the two-dimensional array of antennas of the base station, and M represents the total number of columns in the two-dimensional array of antennas of the base station; and $H_{n,m} = [h_{n,m,0}, h_{n,m,1}, \ldots, h_{n,m,R-1}]^T$, where $h_{n,m,r}$ represents a channel quality measurement result on the port in the n-th row and in the m-th column over the r-th receive antenna, where r ranges from 0 (inclusive) to R−1 (inclusive), where R represents the total number of receive antennas of the user equipment, and the superscript T represents transposition of the matrix.

Furthermore the determining unit 72 is configured:

To obtain an average matrix $R_{HH}$ of the channel correlation matrixes corresponding to the respective rows of ports in Equation 2 below:

$$R_{HH} = \frac{1}{N}\sum_{n=0}^{N-1} R_{HH_n};$$ Equation 2 and

To obtain the horizontal PMI information by decomposing the average matrix $R_{HH}$.

Furthermore the determining unit 72 is configured:

To obtain the channel correlation matrix $R_{HH_m}$ corresponding to the m-th column of ports in the two-dimensional array of antennas of the base station in Equation 3 below:

$$R_{HH_m} = (H_{0,m}, H_{1,m}, \ldots, H_{N-1,m})^{H*}(H_{0,m}, H_{1,m}, \ldots, H_{N-1,m});$$ Equation 3

Where $H_{n,m}$ represents a channel quality measurement value on a port in the n-th row and in the m-th column in the two-dimensional array of antennas of the base station, where n ranges from 0 (inclusive) to N−1 (inclusive), and m ranges from 0 (inclusive) to M−1 (inclusive), where N represents the total number of rows in the two-dimensional array of antennas of the base station, and M represents the total number of columns in the two-dimensional array of antennas of the base station; and $H_{n,m} = [h_{n,m,0}, h_{n,m,1}, \ldots, h_{n,m,R-1}]^T$, where $h_{n,m,r}$ represents a channel quality measurement result on the port in the n-th row and in the m-th column over the r-th receive antenna, where r ranges from 0 (inclusive) to R−1 (inclusive), where R represents the total number of receive antennas of the user equipment, and the superscript T represents transposition of the matrix.

Furthermore the determining unit 72 is configured:

To obtain an average matrix $R_{HH}$ of the channel correlation matrixes corresponding to the respective columns of ports in Equation 4 below:

$$R_{HH} = \frac{1}{M}\sum_{m=0}^{M-1} R_{HH_m};$$ Equation 4 and

To obtain the vertical PMI information by decomposing the average matrix $R_{HH}$.

Furthermore the channel quality measurement resource is a Channel State Information-Reference Signal (CSI-RS) resource; and the channel measurement reference signal is a CSI-RS.

Figure 8:
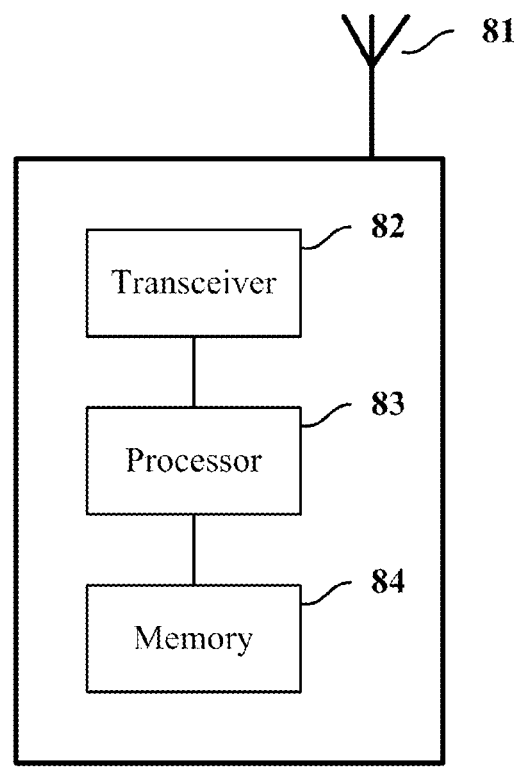
FIG. 8 illustrates a schematic structural diagram of a base station according to another embodiment of the invention.

Referring to FIG. 8, an embodiment of the invention further provides a base station which can perform the method for configuring resources for three-dimensional channel measurement according to the embodiment of the invention. The base station can include a two-dimensional array of antennas 81, a transceiver 82, a processor 83, and a memory 84.

The transceiver 82 can include as needed in practice a baseband processing component, a radio frequency processing component, and other devices for transmitting related information.

The processor 83 is configured with one or more executable programs to select channel quality measurement resources for three-dimensional channel measurement from channel quality measurement resources preconfigured for a user equipment, where each of the channel quality measurement resources corresponds to one time-frequency resource position and at least one port; and to transmit for each of the selected channel quality measurement resources a channel measurement reference signal to the user equipment via the port or ports corresponding to the channel quality measurement resource on the time-frequency resource position corresponding to the channel quality measurement resource, and to transmit indicators of the selected channel quality measurement resources to the user equipment; and The memory 84 is configured to store the one or more executable programs for configuring the processor 83.

Optionally the processor 83 is further configured to configure the user equipment with a plurality of channel quality measurement resources, and to number the measurement resources, before selecting the channel quality measurement resources for three-dimensional channel measurement from the channel quality measurement resources preconfigured for the user equipment, where each of the channel quality measurement resources corresponds to one time-frequency resource position and at least one port; and to transmit indicators of the configured plurality of channel quality measurement resources to the user equipment in Radio Resource Control (RRC) signaling.

Preferably the processor 83 is configured to select at least one of the channel quality measurement resources preconfigured for the user equipment as a channel quality measurement resource for three-dimensional channel measurement, where the sum of the numbers of ports corresponding to the respective selected channel quality measurement resource is equal to the total number of ports to be measured for 3D-MIMO.

Preferably the channel quality measurement resource is a CSI-RS resource; and the channel measurement reference signal is a CSI-RS.

Figure 9:
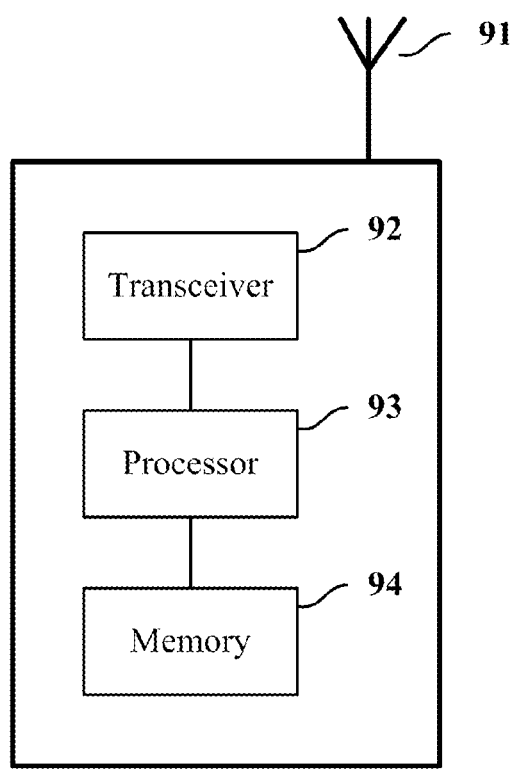
FIG. 9 illustrates a schematic structural diagram of a user equipment according to another embodiment of the invention.

Referring to FIG. 9, an embodiment of the invention further provides a user equipment which can perform the method for three-dimensional channel measurement according to the embodiment of the invention. The user equipment can include antennas 91, a transceiver 92, a processor 93 and a memory 94.

The transceiver 92 can include as needed in practice a baseband processing component, a radio frequency processing component, and other devices for transmitting related information.

The processor 93 is configured with one or more executable programs to receive indicators, transmitted by a base station provided with a two-dimensional array of antennas, of channel quality measurement resources for three-dimensional channel measurement, through the antennas and the transceiver, where the channel quality measurement resources for three-dimensional channel measurement are selected by the base station from channel quality measurement resources preconfigured for the user equipment, and each of the channel quality measurement resources corresponds to one time-frequency resource position and at least one port;

To receive for each of the channel quality measurement resources for three-dimensional channel measurement a channel measurement reference signal transmitted by the base station via the port or ports corresponding to the channel quality measurement resource on the time-frequency resource position corresponding to the channel quality measurement resource through the transceiver and the antennas, to make channel quality measurement according to the channel measurement reference signal, and to obtain three-dimensional channel quality information according to results of the channel quality measurement; and to report the three-dimensional channel quality information to the base station through the transceiver and the antennas.

The memory 94 is configured to store the one or more executable programs for configuring the processor 93.

Furthermore the processor 93 is further configured with an executable program to receive indicators of a plurality of channel quality measurement resources configured by the base station before receiving the indicators, transmitted by the base station, the channel quality measurement resources for three-dimensional channel measurement, where each of the channel quality measurement resources corresponds to one time-frequency resource position and at least one port.

Preferably the sum of the numbers of ports corresponding to the respective channel quality measurement resources for three-dimensional channel measurement is equal to the total number of ports to be measured for 3D-MIMO; and the processor 93 is further configured with an executable program:

To determine the position or positions, in the two-dimensional array of antennas of the base station, of the port or ports corresponding to each of the channel quality measurement resources for three-dimensional channel measurement;

To obtain for each row in the two-dimensional array of antennas of the base station a channel correlation matrix corresponding to the row of ports according to results of the channel quality measurement on the respective ports in the row; and to obtain horizontal Pre-coding Matrix Indicator (PMI) information according to the channel correlation matrixes corresponding to the respective rows of ports, and to obtain horizontal Channel Quality Indicator (CQI) information according to the PMI information; and To obtain for each column in the two-dimensional array of antennas of the base station a channel correlation matrix corresponding to the column of ports according to results of the channel quality measurement on the respective ports in the column; and to obtain vertical PMI information according to the channel correlation matrixes corresponding to the respective columns of ports, and to obtain vertical CQI information according to the PMI information.

Preferably the processor 93 is further configured with an executable program:

To obtain the channel correlation matrix $R_{HH_n}$ corresponding to the n-th row of ports in the two-dimensional array of antennas of the base station in Equation 1 below:

$$R_{HH_n} = (H_{n,0}, H_{n,1}, H_{n,2}, \ldots, H_{n,M-1})^{H*}(H_{n,0}, H_{n,1}, H_{n,2}, \ldots, H_{n,M-1}); \quad \text{Equation 1}$$

Where $H_{n,m}$ represents a channel quality measurement value on a port in the n-th row and in the m-th column in the two-dimensional array of antennas of the base station, where n ranges from 0 (inclusive) to N−1 (inclusive), and m ranges from 0 (inclusive) to M−1 (inclusive), where N represents the total number of rows in the two-dimensional array of antennas of the base station, and M represents the total number of columns in the two-dimensional array of antennas of the base station; and $H_{n,m} = [h_{n,m,0}, h_{n,m,1}, \ldots, h_{n,m,R-1}]^T$, where $h_{n,m,r}$ represents a channel quality measurement result on the port in the n-th row and in the m-th column over the r-th receive antenna, where r ranges from 0 (inclusive) to R−1 (inclusive), where R represents the total number of receive antennas of the user equipment, and the superscript T represents transposition of the matrix.

Preferably the processor 93 is further configured with an executable program:

To obtain an average matrix $R_{HH}$ of the channel correlation matrixes corresponding to the respective rows of ports in Equation 2 below:

$$R_{HH} = \frac{1}{N}\sum_{n=0}^{N-1} R_{HH_n}; \quad \text{Equation 2}$$

and

To obtain the horizontal PMI information by decomposing the average matrix $R_{HH}$.

Preferably the processor 93 is further configured with an executable program:

To obtain the channel correlation matrix $R_{HH_m}$ corresponding to the m-th column of ports in the two-dimensional array of antennas of the base station in Equation 3 below:

$$R_{HH_m} = (H_{0,m}, H_{1,m}, \ldots, H_{N-1,m})^{H*}(H_{0,m}, H_{1,m}, \ldots, H_{N-1,m}); \quad \text{Equation 3}$$

Where $H_{n,m}$ represents a channel quality measurement value on a port in the n-th row and in the m-th column in the two-dimensional array of antennas of the base station, where n ranges from 0 (inclusive) to N−1 (inclusive), and m ranges from 0 (inclusive) to M−1 (inclusive), where N represents the total number of rows in the two-dimensional array of antennas of the base station, and M represents the total number of columns in the two-dimensional array of antennas of the base station; and $H_{n,m} = [h_{n,m,0}, h_{n,m,1}, \ldots, h_{n,m,R-1}]^T$, where $h_{n,m,r}$ represents a channel quality measurement result on the port in the n-th row and in the m-th column over the r-th receive antenna, where r ranges from 0 (inclusive) to R−1 (inclusive), where R represents the total number of receive antennas of the user equipment, and the superscript T represents transposition of the matrix.

Preferably the processor 93 is further configured with an executable program:

To obtain an average matrix $R_{HH}$ of the channel correlation matrixes corresponding to the respective columns of ports in Equation 4 below:

$$R_{HH} = \frac{1}{M}\sum_{m=0}^{M-1} R_{HH_m}; \quad \text{Equation 4}$$

and

To obtain the vertical PMI information by decomposing the average matrix $R_{HH}$.

Preferably the channel quality measurement resource is a CSI-RS resource; and the channel measurement reference signal is a CSI-RS.

In summary, advantageous effects of the invention include:

In the solutions according to the embodiments of the invention, the base station provided with a two-dimensional array of antennas selects channel quality measurement resources for three-dimensional channel measurement from channel quality measurement resources preconfigured for the user equipment, transmits indicators of the selected channel quality measurement resources to the user equipment, and transmits for each of the selected channel quality measurement resources a channel measurement reference signal to the user equipment via the port or ports corresponding to the channel quality measurement resource on the time-frequency resource position corresponding to the channel quality measurement resource; and the user equipment receives the indicators, transmitted by the base station, of the channel quality measurement resources for three-dimensional channel measurement, receives for each of the channel quality measurement resources for three-dimensional channel measurement the channel measurement reference signal transmitted by the base station via the port or ports corresponding to the channel quality measurement resources on the time-frequency resource position corresponding to the channel quality measurement resource, makes channel quality measurement according to the channel measurement reference signal; and obtains three-dimensional channel quality information according to all of results of the channel quality measurement, and reports the three-dimensional channel quality information to the base station. As can be apparent, in the solutions, the base station signals the channel quality measurement resources for three-dimensional channel measurement to the user equipment, and the user equipment makes three-dimensional channel quality measurement over the corresponding channel quality measurement resources, to thereby address the issue of how to make three-dimensional channel quality measurement.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for configuring resources for three-dimensional channel measurement, the method comprising:
    selecting, by a base station provided with a two-dimensional array of antennas, channel quality measurement resources for three-dimensional channel measurement from channel quality measurement resources preconfigured for a user equipment, wherein each of the channel quality measurement resources corresponds to one time-frequency resource position and at least one port; and
    transmitting, by the base station for each of the selected channel quality measurement resources a channel measurement reference signal to the user equipment via the port or ports corresponding to the channel quality measurement resource on the time-frequency resource position corresponding to the channel quality measurement resource, and transmitting indicators of the selected channel quality measurement resources to the user equipment;
    wherein selecting, by the base station, the channel quality measurement resources for three-dimensional channel measurement from the channel quality measurement resources preconfigured for the user equipment comprises:
    selecting, by the base station, at least one of the channel quality measurement resources preconfigured for the user equipment as a channel quality measurement resource for three-dimensional channel measurement, wherein the sum of the numbers of ports corresponding to the respective selected channel quality measurement resource is equal to the total number of ports to be measured for three-dimensional-Multiple Input Multiple Output, 3D-MIMO.

2. The method according to claim 1, wherein before the base station selects the channel quality measurement resources for three-dimensional channel measurement from the channel quality measurement resources preconfigured for the user equipment, the method further comprises:
    configuring, by the base station, the user equipment with a plurality of channel quality measurement resources, and numbering the measurement resources, wherein each of the channel quality measurement resources corresponds to one time-frequency resource position and at least one port; and
    transmitting, by the base station, indicators of the configured plurality of channel quality measurement resources to the user equipment in Radio Resource Control, RRC, signaling.

3. A method for three-dimensional channel measurement, comprising:
    receiving, by a user equipment, indicators, transmitted by a base station provided with a two-dimensional array of antennas, of channel quality measurement resources for three-dimensional channel measurement, wherein the channel quality measurement resources for three-dimensional channel measurement are selected by the base station from channel quality measurement resources preconfigured for the user equipment, and each of the channel quality measurement resources corresponds to one time-frequency resource position and at least one port;
    receiving, by the user equipment, for each of the channel quality measurement resources for three-dimensional channel measurement a channel measurement reference signal transmitted by the base station via the port or ports corresponding to the channel quality measurement resource on the time-frequency resource position corresponding to the channel quality measurement resource, and making channel quality measurement according to the channel measurement reference signal;
    obtaining, by the user equipment, three-dimensional channel quality information according to results of the channel quality measurement, and reporting the three-dimensional channel quality information to the base station;

wherein the sum of the numbers of ports corresponding to the respective channel quality measurement resources for three-dimensional channel measurement is equal to the total number of ports to be measured for 3D-MIMO.

4. The method according to claim 3, wherein before the user equipment receives the indicators, transmitted by the base station, of the channel quality measurement resources for three-dimensional channel measurement, the method further comprises:

receiving, by the user equipment, indicators of a plurality of channel quality measurement resources configured by the base station, wherein each of the channel quality measurement resources corresponds to one time-frequency resource position and at least one port.

5. The method according to claim 3, obtaining, by the user equipment, the three-dimensional channel quality information according to the results of the channel quality measurement comprises:

determining, by the user equipment, the position or positions, in the two-dimensional array of antennas of the base station, of the port or ports corresponding to each of the channel quality measurement resources for three-dimensional channel measurement;

obtaining, by the user equipment for each row in the two-dimensional array of antennas of the base station, a channel correlation matrix corresponding to the row of ports according to results of the channel quality measurement on the respective ports in the row; and obtaining horizontal Pre-coding Matrix Indicator, PMI, information according to the channel correlation matrixes corresponding to the respective rows of ports, and obtaining horizontal Channel Quality Indicator, CQI, information according to the PMI information; and obtaining, by the user equipment for each column in the two-dimensional array of antennas of the base station, a channel correlation matrix corresponding to the column of ports according to results of the channel quality measurement on the respective ports in the column; and obtaining vertical PMI information according to the channel correlation matrixes corresponding to the respective columns of ports, and to obtain vertical CQI information according to the PMI information.

6. The method according to claim 5, wherein the channel correlation matrix $R_{HH_n}$ corresponding to the n-th row of ports in the two-dimensional array of antennas of the base station is obtained in Equation 1 below:

$$R_{HH_n}=(H_{n,0},H_{n,1},H_{n,2},\ldots,H_{n,M-1})^{H*}(H_{n,0},H_{n,1},H_{n,2},\ldots,H_{n,M-1}); \quad \text{Equation 1:}$$

wherein $H_{n,m}$ represents a channel quality measurement value on a port in the n-th row and in the m-th column in the two-dimensional array of antennas of the base station, wherein n ranges from 0 to N−1, and m ranges from 0 to M−1, wherein N represents the total number of rows in the two-dimensional array of antennas of the base station, and M represents the total number of columns in the two-dimensional array of antennas of the base station; and $H_{n,m}=[h_{n,m,0},h_{n,m,1},\ldots,h_{n,m,R-1}]^T$, wherein $h_{n,m,r}$ represents a channel quality measurement result on the port in the n-th row and in the m-th column over the r-th receive antenna, wherein r ranges from 0 to R−1, wherein R represents the total number of receive antennas of the user equipment, and the superscript T represents transposition of the matrix;

wherein obtaining the horizontal PMI information according to the channel correlation matrixes corresponding to the respective rows of ports comprises:

obtaining an average matrix $R_{HH}$ of the channel correlation matrixes corresponding to the respective rows of ports in Equation 2 below:

$$R_{HH} = \frac{1}{N}\sum_{n=0}^{N-1} R_{HH_n}; \quad \text{Equation 2}$$

and obtaining the horizontal PMI information by decomposing the average matrix $R_{HH}$.

7. The method according to claim 5, wherein the channel correlation matrix $R_{HH_m}$ corresponding to the m-th column of ports in the two-dimensional array of antennas of the base station is obtained in Equation 3 below:

$$R_{HH_m}=(H_{0,m},H_{1,m},\ldots,H_{N-1,m})^{H*}(H_{0,m},H_{1,m},\ldots,H_{N-1,m}); \quad \text{Equation 3:}$$

wherein $H_{n,m}$ represents a channel quality measurement value on a port in the n-th row and in the m-th column in the two-dimensional array of antennas of the base station, wherein n ranges from 0 to N−1, and m ranges from 0 to M−1, wherein N represents the total number of rows in the two-dimensional array of antennas of the base station, and M represents the total number of columns in the two-dimensional array of antennas of the base station; and $H_{n,m}=[h_{n,m,0},h_{n,m,1},\ldots,h_{n,m,R-1}]^T$, wherein $h_{n,m,r}$ represents a channel quality measurement result on the port in the n-th row and in the m-th column over the r-th receive antenna, wherein r ranges from 0 to R−1, wherein R represents the total number of receive antennas of the user equipment, and the superscript T represents transposition of the matrix;

wherein obtaining the vertical PMI information according to the channel correlation matrixes corresponding to the respective columns of ports comprises:

obtaining an average matrix $R_{HH}$ of the channel correlation matrixes corresponding to the respective columns of ports in Equation 4 below:

$$R_{HH} = \frac{1}{M}\sum_{m=0}^{M-1} R_{HH_m}; \quad \text{Equation 4}$$

and obtaining the vertical PMI information by decomposing the average matrix $R_{HH}$.

8. A base station, comprising a two-dimensional array of antennas, a transceiver, a processor, and a memory, wherein:

the processor is configured with one or more executable programs to select channel quality measurement resources for three-dimensional channel measurement from channel quality measurement resources preconfigured for a user equipment, wherein each of the channel quality measurement resources corresponds to one time-frequency resource position and at least one port; and to transmit for each of the selected channel quality measurement resources a channel measurement reference signal to the user equipment via the port or ports corresponding to the channel quality measurement resource on the time-frequency resource position corresponding to the channel quality measurement resource, and to transmit indicators of the selected channel quality measurement resources to the user equipment; and the memory is configured to store the one or more executable programs for configuring the processor;

wherein the processor is further configured:

to select at least one of the channel quality measurement resources preconfigured for the user equipment as a channel quality measurement resource for three-dimensional channel measurement, wherein the sum of the numbers of ports corresponding to the respective selected channel quality measurement resource is equal to the total number of ports to be measured for 3D-MIMO.

9. The base station according to claim 8, wherein the processor is further configured:

to configure the user equipment with a plurality of channel quality measurement resources, and to number the measurement resources, before selecting the channel quality measurement resources for three-dimensional channel measurement from the channel quality measurement resources preconfigured for the user equipment, wherein each of the channel quality measurement resources corresponds to one time-frequency resource position and at least one port; and to transmit indicators of the configured plurality of channel quality measurement resources to the user equipment in Radio Resource Control, RRC, signaling.

10. The base station according to claim 8, wherein the channel quality measurement resource is a Channel State Information-Reference Signal, CSI-RS, resource; and the channel measurement reference signal is a CSI-RS.

11. A user equipment, comprising antennas, a transceiver, a processor and a memory, wherein:

the processor is configured with one or more executable programs to receive indicators, transmitted by a base station provided with a two-dimensional array of antennas, of channel quality measurement resources for three-dimensional channel measurement, through the antennas and the transceiver, wherein the channel quality measurement resources for three-dimensional channel measurement are selected by the base station from channel quality measurement resources preconfigured for the user equipment, and each of the channel quality measurement resources corresponds to one time-frequency resource position and at least one port;

to receive for each of the channel quality measurement resources for three-dimensional channel measurement a channel measurement reference signal transmitted by the base station via the port or ports corresponding to the channel quality measurement resource on the time-frequency resource position corresponding to the channel quality measurement resource through the transceiver and the antennas, to make channel quality measurement according to the channel measurement reference signal, and to obtain three-dimensional channel quality information according to results of the channel quality measurement; and to report the three-dimensional channel quality information to the base station through the transceiver and the antennas; and the memory is configured to store the one or more executable programs for configuring the processor;

wherein the sum of the numbers of ports corresponding to the respective channel quality measurement resources for three-dimensional channel measurement is equal to the total number of ports to be measured for 3D-MIMO.

12. The user equipment according to claim 11, wherein the processor is further configured with an executable program:

to receive indicators of a plurality of channel quality measurement resources configured by the base station before receiving the indicators, transmitted by the base station, the channel quality measurement resources for three-dimensional channel measurement, wherein each of the channel quality measurement resources corresponds to one time-frequency resource position and at least one port.

13. The user equipment according to claim 11, the processor is further configured with an executable program:

to determine the position or positions, in the two-dimensional array of antennas of the base station, of the port or ports corresponding to each of the channel quality measurement resources for three-dimensional channel measurement;

to obtain for each row in the two-dimensional array of antennas of the base station a channel correlation matrix corresponding to the row of ports according to results of the channel quality measurement on the respective ports in the row; and to obtain horizontal Pre-coding Matrix Indicator, PMI, information according to the channel correlation matrixes corresponding to the respective rows of ports, and to obtain horizontal Channel Quality Indicator, CQI, information according to the PMI information; and to obtain for each column in the two-dimensional array of antennas of the base station a channel correlation matrix corresponding to the column of ports according to results of the channel quality measurement on the respective ports in the column; and to obtain vertical PMI information according to the channel correlation matrixes corresponding to the respective columns of ports, and to obtain vertical CQI information according to the PMI information.

14. The user equipment according to claim 13, wherein the processor is further configured with an executable program:

to obtain the channel correlation matrix $R_{HH_n}$ corresponding to the n-th row of ports in the two-dimensional array of antennas of the base station in Equation 1 below:

$$R_{HH_n} = (H_{n,0}, H_{n,1}, H_{n,2}, \ldots, H_{n,M-1})^{H*}(H_{n,0}, H_{n,1}, H_{n,2}, \ldots, H_{n,M-1}); \quad \text{Equation 1:}$$

wherein $H_{n,m}$ represents a channel quality measurement value on a port in the n-th row and in the m-th column in the two-dimensional array of antennas of the base station, wherein n ranges from 0 to N−1, and m ranges from 0 to M−1, wherein N represents the total number of rows in the two-dimensional array of antennas of the base station, and M represents the total number of columns in the two-dimensional array of antennas of the base station; and $H_{n,m} = [h_{n,m,0}, h_{n,m,1}, \ldots, h_{n,m,R-1}]^T$, wherein $h_{n,m,r}$ represents a channel quality measurement result on the port in the n-th row and in the m-th column over the r-th receive antenna, wherein r ranges from 0 to R−1, wherein R represents the total number of receive antennas of the user equipment, and the superscript T represents transposition of the matrix.

15. The user equipment according to claim 14, wherein the processor is further configured with an executable program:

to obtain an average matrix $R_{HH}$ of the channel correlation matrixes corresponding to the respective rows of ports in Equation 2 below:

$$R_{HH} = \frac{1}{N}\sum_{n=0}^{N-1} R_{HH_n}; \quad \text{Equation 2}$$

and to obtain the horizontal PMI information by decomposing the average matrix $R_{HH}$.

16. The user equipment according to claim 13, wherein the processor is further configured with an executable program:

to obtain the channel correlation matrix $R_{HH_m}$ corresponding to the m-th column of ports in the two-dimensional array of antennas of the base station in Equation 3 below:

$$R_{HH_m} = (H_{0,m}, H_{1,m}, \ldots, H_{N-1,m})^{H*}(H_{0,m} H_{1,m}, \ldots, H_{N-1,m}); \quad \text{Equation 3}$$

wherein $H_{n,m}$ represents a channel quality measurement value on a port in the n-th row and in the m-th column in the two-dimensional array of antennas of the base station, wherein n ranges from 0 to N−1, and m ranges from 0 to M−1, wherein N represents the total number of rows in the two-dimensional array of antennas of the base station, and M represents the total number of columns in the two-dimensional array of antennas of the base station; and $H_{n,m} = [h_{n,m,0}, h_{n,m,1}, \ldots, h_{n,m,R-1}]^T$, wherein $h_{n,m,r}$ represents a channel quality measurement result on the port in the n-th row and in the m-th column over the r-th receive antenna, wherein r ranges from 0 to R−1, wherein R represents the total number of receive antennas of the user equipment, and the superscript T represents transposition of the matrix.

17. The user equipment according to claim 16, wherein the processor is further configured with an executable program:

to obtain an average matrix $R_{HH}$ of the channel correlation matrixes corresponding to the respective columns of ports in Equation 4 below:

$$R_{HH} = \frac{1}{M}\sum_{m=0}^{M-1} R_{HH_m}; \quad \text{Equation 4}$$

and to obtain the vertical PMI information by decomposing the average matrix $R_{HH}$.

18. The user equipment according to claim 11, wherein the channel quality measurement resource is a Channel State Information-Reference Signal, CSI-RS, resource; and the channel measurement reference signal is a CSI-RS.

* * * * *